United States Patent

Eitz et al.

Patent Number: 5,940,133
Date of Patent: Aug. 17, 1999

[54] METHOD FOR PLAYING BACK DATA SIGNALS IN TELEVISION OR SOUND RADIO PROGRAM CHANNELS

[75] Inventors: Gerhard Eitz, Poing; Werner Brückner, Munich; Sandor Gyarmati, Villingen-Schwenningen, all of Germany

[73] Assignee: Thomson Consumer Electronics, Inc., Indianapolis, Ind.

[21] Appl. No.: 08/642,052

[22] Filed: May 3, 1996

[51] Int. Cl.$^6$ ....................................... H04N 7/00
[52] U.S. Cl. ................ 348/465; 348/467; 348/468; 348/473
[58] Field of Search ................... 348/558, 556, 348/552, 474, 473, 468, 467, 465, 464, 461, 460; H04N 7/00, 7/08

[56] References Cited

U.S. PATENT DOCUMENTS

| | | | |
|---|---|---|---|
| 4,390,901 | 6/1983 | Keiser | 348/465 |
| 5,331,351 | 7/1994 | Haas | 348/558 |
| 5,355,170 | 10/1994 | Eitz | 348/467 |
| 5,383,112 | 1/1995 | Clark | 348/7 |
| 5,457,499 | 10/1995 | Lim | 348/558 |

FOREIGN PATENT DOCUMENTS

| | | | |
|---|---|---|---|
| 0214326 | 1/1990 | European Pat. Off. | H04N 7/087 |
| 0264565 | 11/1991 | European Pat. Off. | H04N 7/087 |

*Primary Examiner*—Bryan Tung
*Attorney, Agent, or Firm*—Joseph S. Tripoli; Peter M. Emanuel; Robert D. Shedd

[57] ABSTRACT

A method of error-free, simple programming of a data decoder for the purpose of recording desired data programs is achieved when a data guide table, generated at the transmitter end, for programming the recording, and a data status table for signaling the data programs currently running are evaluated. In addition to date, time, broadcasting company, identifying number and length of the files, the data guide table contains information on the hardware and software configurations, which is required for receiving, for decoding and for outputting the desired data program, and further information for automatically reloading software possibly missing at the receiver end. In this way, it is possible as early as during programming of a data program to carry out a check of the system configuration required at the receiver end and to output an error message or warning to the user if his own system is not suitable for receiving, decoding or outputting the desired data program. Furthermore, possible errors can be pointed out and, if necessary, a similar data program which is matched to the system configuration at the receiver end can, if appropriate, be loaded automatically, or a missing data program can be reloaded.

9 Claims, 3 Drawing Sheets

DGT-1

BR-DATA SERVICES

"TELE-NEWSPAPER-MORNING EDITION" (5.00-7.00)

"WEATHER SERVICE - FORECAST" (6.00-7.00)

"LEARNING ENGLISH - ITEM 345" (8.00-9.00)

• • •

SELECT BY CURSOR - CONFIRM BY "OK"

DGT-2
COUNTRY='D', BROADC.='BR', DATE='1.1.95',
COMP='486+', RAM='4MB',

I='0815', TIME='5.00-7.00', L='5,4MB', REP='0',
PR='TELE.EXE',FI='TELEFRA.00',...

I='0820', TIME='6.00-7.00', L='1,0MB', REP='1',
PR='STAN.EXE',FI='FRAME.00',...

• • •

PR='TELE.EXE', I='0915', DATE='3.1.95', TIME='2.00-3.00'
FI='TELEFRA.00', I='0916', DATE='3.1.95', TIME='2.30-4.00'

• • •

COMP='386+',RAM='1MB', I='0815-1', TIME=...

FIG. 3

DST
COUNTRY='D', BROADC.='BR',DATE='1.1.95',
I='0815', BLOCK='1AA-x, STATUS='RUNNING',REP='0/0',
I='0820', BLOCK='1AC-x', STATUS='NEXT', REP='0/1'

DGT-1

BR-DATA SERVICES

"TELE-NEWSPAPER-MORNING EDITION" (5.00-7.00)

• • •

"TELE-NEWSPAPER-NOON EDITION" (11.00-12.00)

• • •

SELECT BY CURSOR - CONFIRM BY "OK"

DGT-2

COUNTRY='D', BROADC.='BR', DATE='1.1.95',
COMP='486+', RAM='4MB',

I='0815', TIME='5.00-7.00', L='5,4MB', REP='0',
PR='TELE.EXE',FI='TELEFRA.00',...

I='0816', TIME='11.00-12.00', L='1,1MB', REP='0',
UPDATE_OF_I='0815'

• • •

PR='TELE.EXE', I='0915', DATE='3.1.95', TIME='2.00-3.00'
FI='TELEFRA.00', I='0916', DATE='3.1.95', TIME='2.30-4.00'

METHOD FOR PLAYING BACK DATA SIGNALS IN TELEVISION OR SOUND RADIO PROGRAM CHANNELS

BACKGROUND OF THE INVENTION

The invention relates to a method in accordance with the preamble of patent claim 1. Such a method is disclosed in DE 39 14 697 C2 corresponding to U.S. Pat. No. 5,355,170 issued Oct. 11, 1994 to Gerhard Eitz.

In the conventional teletext system used at present in Europe, use is made of the so-called "Level 1" of the WST (World System Teletext) teletext standard, which permits texts and graphic representations to be represented with a restricted basic character set on a screen, on a page which consists of a head row and 23 rows.

As disclosed in DE 39 14 697 C2, in addition to these pages Level 1 can be used to transmit further supplementary data for special characters, fine structures and colour shadings. In addition to the desired Level 1 page, the associated supplementary data are intermediately stored at the receiving end and displayed together with the relevant Level 1 page on the screen.

Furthermore, for the purpose of programming a video recorder it is known from EP 0 214 326 for hidden program identifiers with an enhanced error protection to be transmitted in teletext pages in addition to the information represented visibly. The viewer marks the desired program on a program listing page and thus selects the associated program identifier for the recording. The program identifier, which additionally contains further code numbers for the respective program source and the calendar date, uniquely identifies a program and is transmitted together with a program. The video recorder starts to record when the preprogrammed program identifier matches that just detected. With such event-controlled recording, temporal shifts and interruptions etc. remain without effect on the recording, since the video recorder can react appropriately. In the event of cancellation of a program, an unnecessarily long "lurking" of the video recording can be avoided by transmitting a special cancellation identifier instead of the program identifier.

Furthermore, it is known from EP 0 264 565 B1 to use special pages to transmit information on the teletext pages currently being transmitted and evaluate it at the receiver end. By evaluating the special page in the receiver, it is possible to check whether a teletext page desired by the user has been transmitted at all, to select the teletext pages without unnecessary waiting time and to use the available decoder memory in an optimum fashion.

SUMMARY OF THE INVENTION

By contrast, it is the object of the invention to improve a method of the type mentioned at the beginning so that for future data services which are further developed from the teletext service and transmitted together with television or sound radio signals or else independently in a dedicated channel, error-free, simple programming of data decoders is achieved for the purpose of recording desired data programs, and a corresponding signalling of the data programs currently running is achieved. In this case, a data program is to be regarded as the transmission of one or more data files, for example for an electronic newspaper, an electronic program guide, a weather service or other, arbitrary data files with texts, images, possibly image sequences and sounds. In particular, it must be avoided that a data program already received turns out to be incapable of running when called up by the user because, for example, a subprogram is missing or the system configuration of the user is inadequate, because the computing power is too low.

In the method according to the invention, error-free, simple programming of a data decoder for the purpose of recording desired data programs is achieved when a data guide table, generated at the transmitter end, for programming the recording, and a data status table for signalling the data programs currently running are evaluated. In addition to date, time, broadcasting company, identifying number and length of the files, the data guide table contains information on the hardware and software configurations, which is required for receiving, for decoding and for outputting the desired data program, and further information for automatically reloading software possibly missing at the receiver end. In this way, it is possible as early as during programming of a data program to carry out a check of the system configuration required at the receiver end and to output an error message or warning to the user if his own system is not suitable for receiving, decoding or outputting the desired data program. Furthermore, possible errors can be pointed out and, if necessary, a similar data program which is matched to the system configuration at the receiver end can, if appropriate, be loaded automatically, or a missing data program can be reloaded.

It is of advantage to transmit also data service parameter within the data status table and/or data guide table, which contain additional information about all transmitted data services. These make an error-free decoding possible even if the different data services use different transmission parameter. In addition, it is of advantage to check with the help of the data service parameter whether the decoder is suited to process the respective data.

The data service parameter can contain the following information:

1) form of the frame word for byte-synchronization of the data service (framing code);
2) an information whether the data transmission is performed page by page or packet by packet;

For transmission page by page:
3a) the respective page number;
3b) whether the 20 ms rule is fulfilled, not fulfilled or only partly fulfilled. If the 20 ms rule is fulfilled, i.e. for a distance between header and next data line of 20 ms minimum, a decoding also by existing decoders is possible;
3c) according to which protocol the transmission is performed;
4) Channel Network Identification (CNI)-Code, i.e. the channel name is given on which the data service is transmitted.

It is of advantage to transmit the data service parameter in the data guide table DGT-2. In addition, a channel list with the different channel names can be transmitted in the data guide table DGT-1 in order to make-by their display-an overview for the user possible.

BRIEF DESCRIPTION OF THE DRAWINGS

The invention is explained in more detail with the aid of the drawings, in which:

FIG. 3 shows a diagrammatic representation of the data guide table DGT with the information which is relevant for programming the data decoder in order to record desired data;

FIG. 4 shows a diagrammatic representation of the data status table DST with the information which is important for signalling the data transmission currently running; and FIG. 5 shows a diagrammatic representation of the data guide table DGT with the relevant information which is important for programming data which are transmitted only as updates of other data.

DETAILED DESCRIPTION OF THE PREFERRED EMBODIMENT

Figure 1:
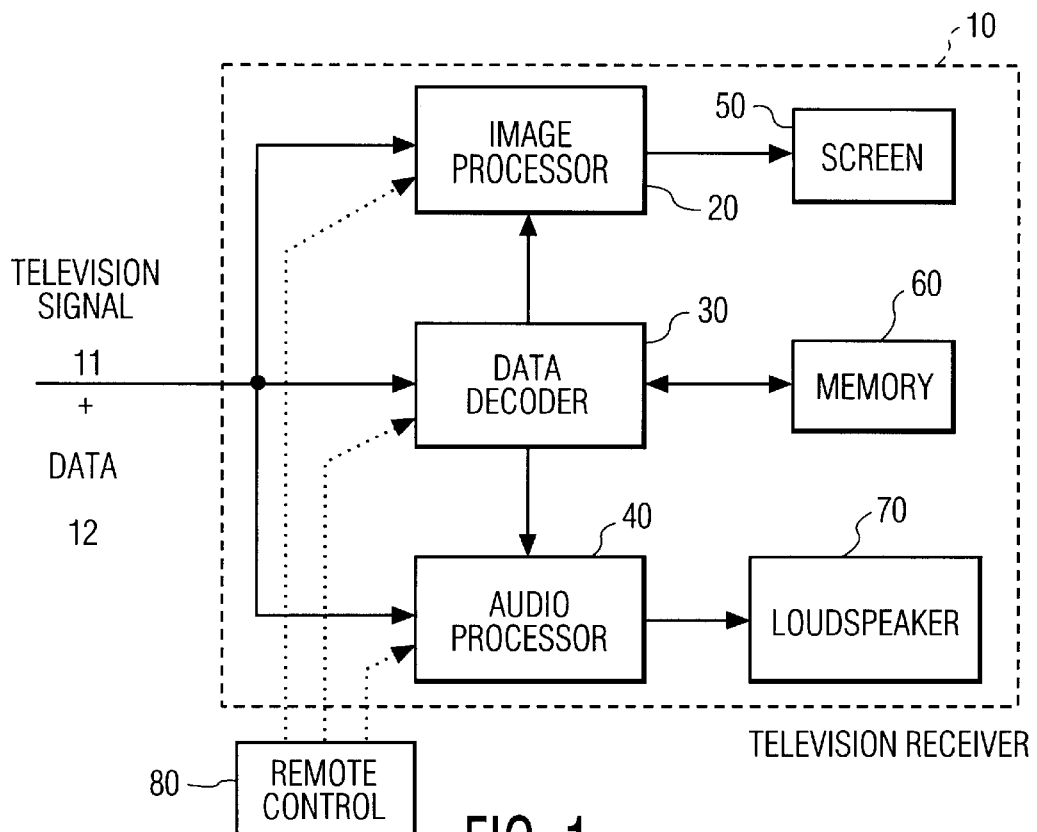
FIG. 1 shows a diagrammatic representation of an analogue or digital television receiver with a data decoder and an associated data memory and devices for image and sound decoding.

FIG. 1 shows a block diagram of a future television receiver 10 which can receive and decode analogue or digital television signals 11 and/or data signals 12. In the case of a digital television signal, the data of the data signal can also be contained in a suitable way in the data stream of the digital television signal. In the case of an analogue television signal, the data of the data signal can also be contained in the vertical blanking interval of the television signal. The television signal 11 and the data signal 12 are fed, on the one hand, to an image processor 20, which decodes the television signal 12 and displays it on the screen 50, and are fed, on the other hand, to an audio processor 40 which decodes the sound signals (television sound signals and/or sound radio signals) contained in the television signal and outputs them to a loudspeaker. Furthermore, the television signal 11 and data signal 12 are fed to a data decoder 30. The data decoder 30, which is controlled, like the image processor 20 and the audio processor 40, via a remote control 80, separates the data of the data signal 12, which are arranged by page in the analogue system and by block in the digital system, from the television signal 11 and preferably stores the data requested by the user via the remote control 80 in a memory 60. As soon as the requested data have all arrived, they can be retrieved from the memory 60 and played back on the screen 50 and loudspeaker 70 via the image processor 20 and audio processor 40.

Figure 2:
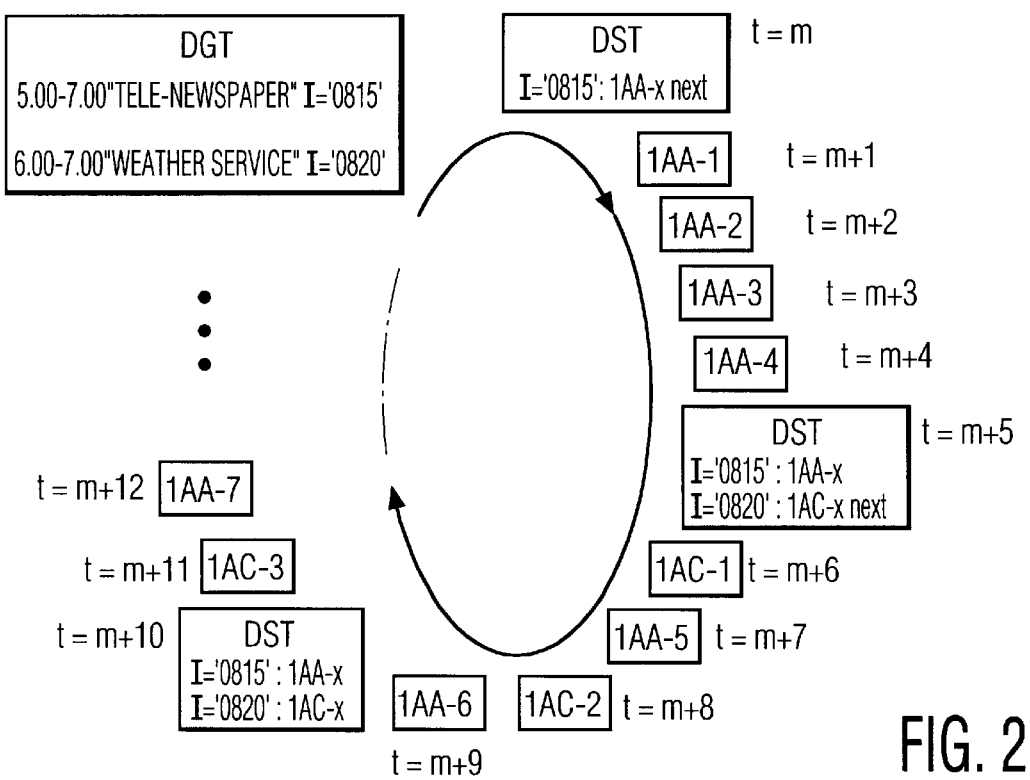
FIG. 2 shows a diagrammatic representation of data transmission using the data guide table DGT and the data status table DST.

FIG. 2 shows a diagram of the content of the data signal 12 with the data guide table DGT, the data status table DST and two data programs, which are transmitted in blocks or pages and, for example, are reassembled into files at the receiving end in accordance with the transmitting end.

The data guide table DGT informs the user of the data programs offered by the relevant broadcasting company. As FIG. 2 shows, for example, in the time between 5.00 and 7.00 hours a tele-newspaper is transmitted with identification information I="0815", which is not visible to the user, and between 6.00 and 7.00 hours a weather service is transmitted with I="0820". The user selects the desired data program and programs the recording, and the data decoder stores the associated information, relevant for the desired recording, from the DGT.

The data status table DST is transmitted at short time intervals between the different data programs and contains information on the data programs which are currently being transmitted or are to be transmitted. Thus, the data status table DST shows at the instant t=m that a data program with the identification information I="0815" will soon be transmitted under the block or page No. 1AA-x. At the instant t=m+1, transmission of the first block or of the first page 1AA-1 is performed, at t=m+2 transmission of 1AA-2 etc. At the instant t=m+5, it is possible, in turn, for the data decoder to detect a data status table DST with information on the transmission currently running of the data program I="0815" and on a transmission, soon to follow on block or page 1AC-x, of data program I="0820". In accordance with the announcement the last DST, the blocks or pages 1AC-x and 1AA-x for both data programs are alternately transmitted at the following instants t=m+6, t=m+7, etc.

In order to record or store the desired data program, in the specified period the data decoder 30 loads the incoming data status tables DST into an intermediate memory, which can be present inside the memory 60, and examines it for the programmed identification information. In the case of a positive search result, the associated block number or page number is detected, and all the blocks or pages belonging to the programmed identification information are stored sequentially in the memory 60.

In order to illustrate the invention, FIG. 3 shows the data guide table DGT-1 visible to the viewer and the associated invisible DGT-2. The plain writing identifier "tele-newspaper—morning edition" in DGT-1 is assigned the identification information I="0815" with the data on the time of transmission (time="5.00–7.00"), the transmitted data set (L="5,4MB"), the number of the repetitions (Rep="0") and further identifiers with identification information (Pr="Tele.exe" with I="0915", date=. . . and, correspondingly, Fi="Telefra.00" with I="0916", date=. . . ) in DGT-2. Also contained in DGT-2 are general data on land (Country="D") broadcasting company (Broadc.="BR"), date of transmission (date="1.1.95") and the required system configuration of the receiver "Comp="486+" and RAM="4MB").

Via the remote control 80, the user selects the desired data program, for example "tele-newspaper—morning edition" from DGT-1. Thereupon, the data decoder 30 checks whether the system configuration present at the receiver end and the storage space for the selected data program are sufficient. If the receiving system of the television receiver 10 is equipped, for example, with a 386 processor and 1 Mbyte RAM, it is not possible to receive the "tele-newspaper—morning edition" with I="0815", since this data program is suitable only for 486 processors with 4 Mbyte RAM. Instead of this, the data program with I="0815-1" can be received, decoded and output by such a television receiver 10 (see FIG. 3: Comp="386+" and RAM="1MB").

The data decoder 30 also checks whether all data necessary for decoding and outputting the selected data program are present in the television receiver 10; for selected "tele-newspaper—morning edition", these are, for example, the program "Tele.exe" and the data file "Telefra.00" (FIG. 3). If one of these files is missing, it can be reloaded automatically by the television receiver 10. The information required for this is likewise located in DGT-2: Pr="Tele.exe" with I="0915", . . . and Fi="Telefra.00" with I="0916". . . .

FIG. 4 shows a diagrammatic representation of the data status table DST with the information, important for signalling the data transmission currently running, at instant t=m+5 from FIG. 1. In accordance with the DGT-2 from FIG. 3, the data status table DST contains data on the country (Country="D"), the transmitting broadcasting company (Broadc.="BR") and the date of transmission (date="1.1.95"). As already explained in FIG. 1, the data program "tele-newspaper—morning edition" with the identification information I="0815" is currently being transmitted in the block or page number 1AA-x with the status "running". In addition, the information Rep="0/0" or Rep="0/1" specifies in the case of I="0820" that the associated data are being transmitted for the first time and that no or one repetition of the data transmission will follow. This information can be important for the data decoder 30, for example, if blocks are being received erroneously. Thus, if a further following repetition is signalled, it is possible, for example, to replace these blocks by correct blocks from a following entry from the data decoder 30.

A basic idea of the invention is to be illustrated once again in FIG. 5 with a diagrammatic representation of the data guide table DGT with a data program with is transmitted as an update to another data program. The user selects the "tele-newspaper—noon edition"; the data decoder 30 recognizes from the information in the DGT-2 that the selected data program "tele-newspaper—noon edition" with the identification information I="0816" will be transmitted between 11.00 and 12.00 hours as an update of the "tele-newspaper—morning edition" with I="0815", and stores both data programs automatically in the memory 60. It is thereby ensured that incomplete or erroneous programming is excluded.

We claim:

1. Method of playing back data signals in television or sound radio program channels, which are separated from the program signal, wherein the data signals have no link to the television or sound radio program data, in which the data belonging to identification information are assembled to form a data program and the data thus assembled are intermediately stored, there being contained in the data signal lists which are evaluated at the receiver end, characterized in that one or more lists contain the following identifiers which arc assigned to the identification information:

a) configuration identifiers for a receiver configuration required for receiving, decoding and playing back the data program, and/or
   b) file identifiers for data files which are required for decoding and playing back the data program, the identification information being assigned plain writing identifiers which are contained in the same list as the configuration identifiers, file identifiers or in other lists, and in that upon the selection of a plain writing identifier in a list selected by the user a process is initialized in which c) the configuration identifier assigned to the plain writing identifier is evaluated as to whether the receiver configuration is sufficient for receiving, decoding and playing back the data program identified by the identification information, and/or
   d) the file identifiers assigned to the plain writing identifier are evaluated as to whether the data files identified by the file identifiers are present at the receiver end, and in which on the basis of positive results in step c) and/or in step d) the identification information associated with the selected plain writing is intermediately stored and upon receipt of the intermediately stored identification information the storage of the associated data of the data program is performed, and in which an appropriate message is output to the user on the basis of negative results from step c) and/or from step d).

2. Method according to claim 1, characterized in that further identification information with further assigned configuration identifiers for at least one other system configuration required at the receiver end is contained in the lists, and in that in the event of a negative result in step c) instead of the identification information selected by the user the further configuration identifiers select as a substitute and store intermediately such further identification information whose assigned configuration identifier for the receiver-end system configuration is sufficient for receiving, decoding and playing back the desired data program.

3. Method according to claim 1, characterized in that in the event of a negative result in step d) the identification information, whose associated data files are not present at the receiver end are detected and intermediately stored from the identification information assigned to the missing data files, and in that upon receipt of the intermediately stored identification information storage of the associated data files is performed.

4. Method of transmitting data signals which are played back in accordance with claim 1, characterized by the repeated transmission of a separate list which contains at least one item of identification information and the page or block numbers under which the data program identified by the identification information is transmitted.

5. Method according to claim 4, characterized in that the separate list contains further information on the current transmission status of the associated data programs.

6. Method according to claim 4, characterized in that the separate list contains further information on the total number of the repetitions and the serial number of the current repetition of the associated data programs.

7. Method according to claim 1 characterized in that the one or more lists comprise one or more of the following parameters about the transmitted data services:

1) form of the frame word for byte-synchronization of the data service;
   2) data transmission page by page or packet by packet;
   for transmission page by page:
   3a) the respective page number;
   3b) whether the 20 ms rule is fulfilled, not fulfilled or only partly fulfilled;
   3c) used transmission protocol;
   4) channel name.

8. Method according to claim 7, characterized in that the parameters are transmitted in a first data guide table.

9. Method according to claim 8, characterized in that in a second data guide table a channel list with the different channel names is additionally transmitted.

* * * * *

UNITED STATES PATENT AND TRADEMARK OFFICE
CERTIFICATE OF CORRECTION

PATENT NO. : 5,940,133
DATED : August 17, 1999
INVENTOR(S) : Gerhard Eitz, Werner Bruckner, Sandor Gyarmati It is certified that error appears in the above-identified patent and that said Letters Patent is hereby corrected as shown below:

On the title page, Item,
    [73] Assignee: replace " Thomson Consumer Electronics, Inc., Indianapolis, Ind." with --Deutsche Thomson-Brandt GmbH, Villingen-Schwenningen, Germany--.

Signed and Sealed this

Twenty-fourth Day of October, 2000

Attest:

Q. TODD DICKINSON

*Attesting Officer*     *Director of Patents and Trademarks*